United States Patent Office 3,342,576
Patented Sept. 19, 1967

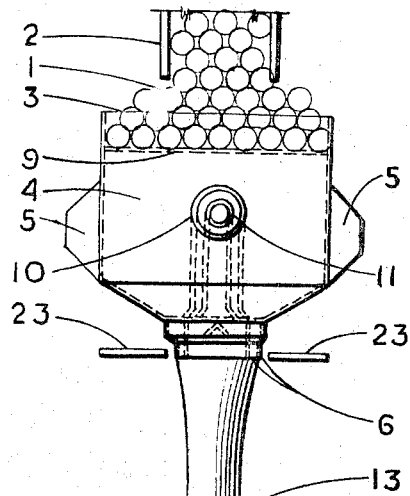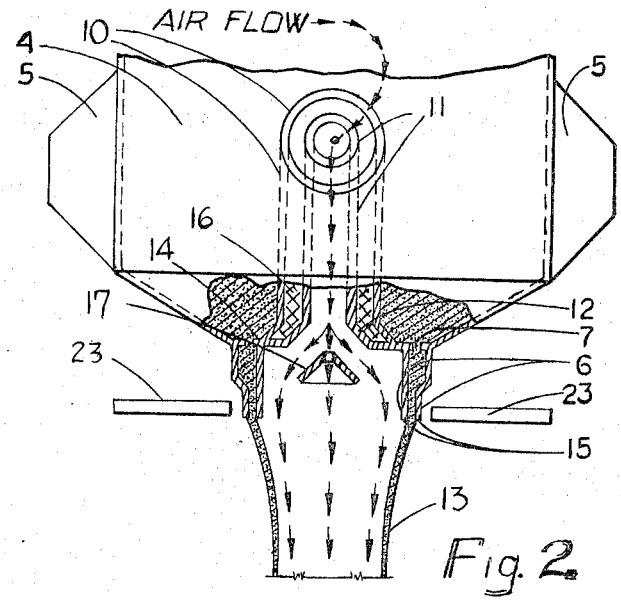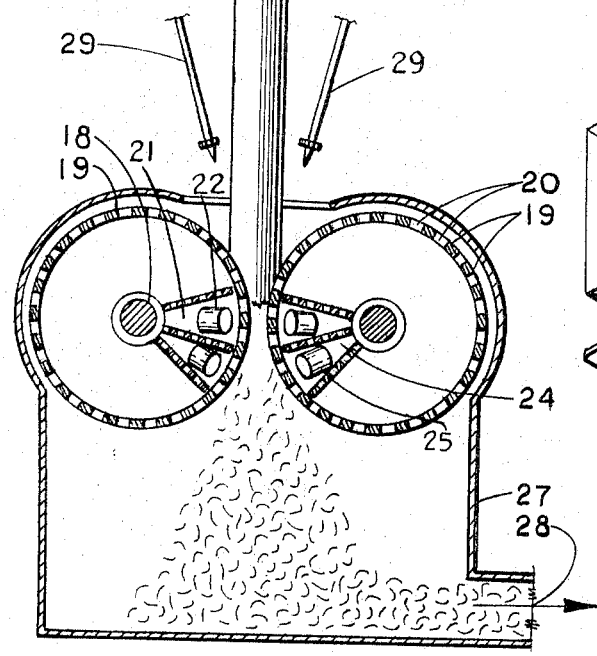

3,342,576
APPARATUS FOR PRODUCING GLASS FLAKES
Robert Z. Schreffler, Brigham City, Utah
(12817 Richmond St., Chester, Va. 23831)
Filed July 5, 1963, Ser. No. 292,931
2 Claims. (Cl. 65—187)

ABSTRACT OF THE DISCLOSURE

Glass flakes are produced by fracturing a thin-walled glass tube, the tube formed by passing molten glass through an annular space. An air current blows down the interior of the glass tube as it is formed.

---

This invention relates to the production of flakes or platelets of glass, and more particularly to improvements in a method and means for producing glass flakes in a process wherein glass is continuously drawn by mechanical attenuating means into a thin-walled tubular form which is concomitantly fragmented into a multiplicity of flakes.

This invention relates to foliated glass in the form of flakes, and more particularly to an improvement in a method and an apparatus for producing flake glass wherein more absolute thickness control will be inherent in the bushing operation. This improvement is an effort to reduce the amount of substandard yield in flake glass production.

Foliated glass in the form of flakes in the order of a few microns in thickness is a relatively recent and novel product rapidly finding a broad range of new uses including reinforcing agents for a vast number of materials such as synthetic resins, rubber, cement, mastic compositions, papers of high dielectric resistance, and combinations of these materials. Also, this material may be combined with other reinforcing agents such as fibrous glass strand for reinforcing, resinous materials, and the like. Still further it may be admixed with other pulverant materials such as fillers, extenders, modifiers, and the like. For a wider variety of substances this flake glass may be pulverized and used as a filler pulverant material itself.

Particularly in certain resinous materials and the like it becomes a matter of extreme necessity that the flake glass thickness remain as constant and as uniform as the process will possibly allow it to be controlled. It is in this respect that this improvement in the process is herein set forth.

Of the methods thus far developed to produce glass flakes, limitations and deficiencies in performance exist to an extent which has spurred a continuous search for a more fully satisfactory process. One commercial process for making glass flakes involves flowing molten glass in tubular form from an annular orifice into a glass melter, internally pressurizing the tubular form, and engaging and almost completely flattening the tubular form between opposed pulling rolls while it is still in a medium-temperature plastic condition. Complete flattening of the hot tubular form between the rolls produces a laminated two-ply or double-thickness ribbon of glass which when subsequently fragmented yields undesirable double-thickness glass flakes. Single-thickness flakes, however, have proven more desirable in end uses. Spacing the pulling rolls a slight distance from each other and passing air through the tubular glass structure prevents internal contact of the opposite walls of the flat tube as it passes between these rolls. Nonuniformities are occasionally imparted to the glass structure in such instances by permitting temperature differentials to become established between the contacted portions and the noncontacted marginal folds of the flattened tubes.

In view of the foregoing, it is a further object of this invention to provide an economical and stable flake-forming process wherein the tendencies toward forming breakouts (and their after-effects) are minimized.

It is another object of this invention to produce continuously by mechanical attenuation a thin-walled tubular glass structure, fully attenuated and in an almost set condition before contact and fragmentation, thereby promoting the formation of uniform, single-thickness glass flakes without danger of plastic cohesion.

It is a further object of this invention to provide a method and apparatus for the continuous production of thin, single-walled glass flakes from a continuously formed thin-walled tube wherein the flakes are substantially free from thickness variations and surface imperfections usually experienced in the glass walls of tubes from which flakes are fragmented.

According to the present invention, forming imperfections are overcome by providing an additional wall arrangement within the orificed ring-type, thin-walled, tube-forming feeder at the point where the thin-walled film of molten glass is emitted from the feeder. By then attenuating the thin-walled tubular structure with means located at sufficient distance from the feeder to assure that the film of glass at the point of contact by the attenuating means is substantially set, a minimum of possibility of imperfections is imparted thereto by the attenuating means.

With the wall thickness of the filming tube on the order of a few microns and with the necessity of keeping this wall thickness as uniform as possible, this improvement in the process is promulgated. Existing flake glass devices produce glass film in a cylindrical tube by action of molten glass flowing through a circumference of holes while the glass is in a molten or plastic state. The molten glass collects in a downward flow upon the inner surface of a single circular lip attached to and disposed vertically from the bottom of the bushing adjacent to and beyond the outer surface of the circumference of holes. In an effort to control the amount of metering of the molten glass through the holes provided, it has been the practice in the past to use various size hole diameters in certain areas of this circumference of holes to meter by volume the molten glass in order to control smaller flows in hot areas and larger flows in colder, more viscous areas.

Further, a condition exists in the present operation called "lip-fouling," wherein molten glass becomes devitrified either by the attenuated tube's bursting or shriveling, leaving deposits of glass on the bushing lip area causing a disturbance of the heat and/or air patterns used for cooling controls. Centrally disposed within the ring of circumferential metering holes is an air line with an air deflector attached at the outlet end. This air deflector directs the flow of air from tube outlet against the molten glass stored on the inside of the circular bushing lip, and is very easily fouled with glass.

According, this invention is an advance in the art of producing foliated glass in the form of flakes and with a maximum of thickness control due to a second concentric depending lip attached to the bushing and disposed at an equal distance to and slightly to the inside of the current operating lip and circumference of holes. Between these two concentric lips would be disposed the circular metering holes as mentioned above. The advantage of the second lip is that the molten glass metered through the circumference of holes would be bounded on either side by a constraining lip, thus delivering a cylinder of molten glass of constant thickness throughout its entire circumference to the lower lip area. A second advantage of the multiple lip arrangement is the prevention of glass fouling of the multiple lip area and of the air deflector centrally disposed therein. A third advantage of the multiple lip arrangement arises from the ability to compress or to open the gap between the two concentric lips, thereby providing a better local thickness control of the molten glass to be attenuated at the point of delivery where attenuation takes place.

By provision of this glass restraining wall means in the form of the ring associated with the tubular film forming feeder, temperature dampening is effected at the zone of emission of the glass from the feeder, thereby reducing tendencies toward hot spots in the glass which result in corresponding imperfections in the tube structure and fragmented flakes.

Further, the presence of an air inlet cooling means centered radially within the zone of formation of the thin-walled glass tube permits the glass within the melter supplying the feeder to be raised without as great concern over whether or not the glass emitted will be in the film-forming viscosity range. Without such air-cooling means, the glass is limited in temperature to which it may be raised by reason of its surface tension upon emission from the feeder between the two confining walls. If the temperature is too high relative to the viscosity of the material, the result would be disruption in the flow of the film in the tubular form. Therefore, an improved method has been provided for producing foliated glass in flake form wherein the maximum effect is realized through a more complete and effective usage of the air provided through the tubing centrally disposed within the bushing and directed toward the inner lip by means of the air deflector.

Furthermore, by permitting the glass to be raised to a higher temperature, the flake imperfections from possible devitrification of the glass in the usual film-forming viscosity range is eliminated.

This invention will be more fully understood and can be readily carried out from the following description taken in connection with the invention as exemplified by the embodiments illustrated in the accompanying drawings in which:

FIGURE 1 is a somewhat diagrammatic front elevational view, partially in cross section, of apparatus incorporating the principles of the present invention;

FIGURE 2 is a fragmentary enlargement of a portion of the frontal elevation of the apparatus of FIGURE 1, showing with greater clarity the zone of formation and thermal conditioning of the tubular glass;

FIGURE 3 is a fragmentary perspective view showing another embodiment of the invention wherein the tubular glass body is thermally conditioned according to the principles of this invention.

Referring now in greater detail to the invention as illustrated in FIGURE 1 and 2, a form of apparatus of this invention is illustrated whereby the desired relatively thin, single-thickness flakes of glass can be made. Glass marbles 1, previously produced of glass of selected formulations, are maintained in bulk supply in a receptacle or hopper 2 and are advanced by gravity into the perforate melting trough 9 of the glass melter 4. The melter is made of material having high electrical conducting and heat transferring properties such as platinum or alloys thereof. Terminal lugs 5 integrally attached to the exterior of the sidewalls are connected to a suitable source of electrical current. Sufficient heat is generated by the energizer melter to melt the glass marbles 1 and to maintain a supply of molten glass at the desired temperature and viscosity; entrance to trough 9 at 3.

The molten glass is discharged through the orificed plate 14 in the bottom of the melter 4 along and from the circular depending wall 6 in the form of a thin-walled tubular body of glass 13. The tubular body of glass 13 is internally supported by a fluid under pressure introduced within the tube through conduit 11 provided in the melter 4. As the tubular glass body is emitted from the circular depending walls 6, it is also thermally conditioned from the center by the air cooling effect to modify the temperature and viscosity of the flowing molten glass contacting the interior depending wall to promote stable tube-forming operations.

Forces for attenuation of the tubular glass stream 13 are provided by a pair of coacting attenuating rolls 19 located some distance below the circular depending walls 6. The distance between the circular depending walls 6 and the attenuating rolls 19 is sufficient to allow attenuating and progressive cooling to a set condition of the tubular glass body 13 before its engagement by the attenuating rolls 19.

The attenuating rolls 19 are mounted in closely spaced relation on rotatable shafts 18 operatively connected with a suitable driving mechanism for noncontacting rotation in coacting engaging relation with opposite sides of the freshly set thin-walled tube of glass 13.

The rolls 19 are peripherally perforated and are interiorly partitioned by stationary members which establish negative pressure chambers 21 on opposite sides of the glass tube 13. Each of the chambers 21 is fitted with a gas exhaust tube 22 connected to suitable air-withdrawing means. Below and immediately adjacent to each of the negative pressure chambers 21 are positive pressure chambers 24 within the rolls, each fitted with gas inlet tubes 25 connected to suitable air-supplying means. By this arrangement, the peripheral surfaces of the coacting rolls are provided with a positive pressure zone immediately succeeding the negative pressure zones.

The set tubular glass body 13 is mechanically engaged by the perforate peripheral surfaces of the opposed coacting attenuating rolls 19. The negative pressure acting through the perforations 20 facilitates this engagement and thereby promotes more positive establishment of the desired pulling forces along the length of tubular glass stream 13. As the rolls diverge, the flexible glass tube is parted into two discrete films, each engaging the peripheral surface of one of the rolls 19. As the solidified films are carried into the zone of positive pressure the glass in film-like condition is disengaged from the surfaces and simultaneously fragmented into a multiplicity of single-thickness glass flakes which fall downward into the collection hood 27, from which they may be removed through outlet 28 for subsequent use. The tube 13 is coated with a release agent through nozzles 29.

A release agent may be sprayed on the walls of the tubular glass body 13 simultaneously with introduction of the thin-walled tube into the bite of the coacting rolls 19. The release agent prevents adhesion between the individual glass flakes after their formation. Calcium carbonate is a successful material for this purpose. Other treatments of the glass may be effected in this zone, such as providing coupling agents which will promote combination of the flakes with resins.

Referring in still greater detail to FIGURE 2, it will be seen that the molten glass from which the tube 13 is drawn is attenuated into a conical form extending from the ring lips 15, an area located at the bottom of the circular depending walls 6. The circular depending wall 6 is an annular orificed ring formed of a circular plate 14 having a plurality of circumferentially distributed orifices 7. The plate 14 has two depending walls 6. The exterior depending wall and interior depending wall extend in bounding relationship about the outer and inner circumferential area of annular orifices in the orificed plate 14. The glass emitted from the melter through the orifices 7 in the plate 14 flows as streams to the interior of the annular depending walls 6 where the streams combine as a molten ring of glass which flows downward to the bottom edge of circular depending walls 6. The bottom edges 15 of the circular depending walls 6 are in a sense concentric circular lips from which the glass can be withdrawn into the hollow cone from which the tube 13 is attenuated.

To assure that the cone of molten and plastic glass does not collapse upon application of the attenuating forces thereto, an internal pressure is established to maintain the cone internally supported or blown against collapse. The internal pressure is developed by supply of air or other gaseous fluid through an inlet tube 11, shielded by an outer casing 10 disposed within the melter 4. The gas supply tube 11 and its outer casing 10 are made of a high-temperature metal such as platinum disposed within the molten glass within the melter. A refractory material 16 is interposed between the outer casing 10 and the inlet tube 11 to provide a thermal insulation against the differential in temperature between the gas and the glass so that the glass is assured of a free flow over the casing without freezing. The inlet tube 11 extends from outside the melter to the interior and down through a central portion of the circular plate 14, thereby placing the outlet of the gaseous supply tube on the interior of the cone of molten glass being attenuated from the concentric lip 6. The outlet orifice of the gaseous supply tube 11 is in an outwardly flared head 12, while the orifice itself is an annular slot shaped to assure uniform circumferential distribution of the gas interiorly in the cone. The air supplied to the interior of the cone is cooler than the glass defining the cone and thus effects a forceful interior cooling of the glass as diverted in a conical fashion by an air deflector cone 17. If desired, however, in specific instances the air can be provided in heated condition to modify conditions of attenuation.

By reason of the length of the circular concentric depending walls 6, the glass retained in the melter can be held at a temperature several hundred degrees above the desired attenuating temperature owing to increased heat loss from the walls 6 in order to facilitate a complete solution of the ingredients of the glass, and thereby eliminate stria, cords, or other non-homogeneities. Furthermore, the glass may be held at a conditioning temperature within the melter several degrees higher than the devitrification temperature which otherwise presents difficulties should the glass be allowed to flow at temperatures approaching devitrification conditions. The fluidity of the glass at this high temperature is such that it readily flows through the orifices and re-combines within the concentric circular depending walls prior to collecting at the annular lips 15 of the depending walls 6. Such ease of flow assures uniformity throughout the circumference of the walls of the tubular body upon attenuation of such glass.

By reason of the presence of the cone of cooling air means in the vicinity of the inner lip of the inner depending wall, the glass emitted and chilled is prevented from freely flowing over the inner lip edge to the inner exterior surface of the inner depending wall. That is, the chilling of the glass, which would otherwise be in a highly fluid state, is effective to raise its viscosity so that flooding and fouling possibilities are reduced, especially in regard to the conical air flow problem from between surfaces bounded by 12 and 17.

FIGURE 2 of the drawings illustrates also another form of fouling-prevention of the outer annular lip 15 in that a removable annular shield of mica 23 is associated outwardly of the exterior depending wall 6 which acts as an easy release surface from hot glass. The annular anti-fouling plate 23 is shown in the present instance associated in relation to the melter and without any refractory enclosing the melter.

In FIGURE 3 the enclosed refractory 8 surrounds the melter, and the plate 23 is supported by means not shown, immediately thereon in surrounding relation with the depending walls 6. This arrangement has the advantage that it protects the refractory against the radiant energy emitted from the forming cone and simultaneously acts to prevent flooding of the glass over the lip 15 of the outer depending wall 6.

A hot spot or some other temperature imbalance might occur within the areas of the orificed annular plate 14, or bounded by the concentric circular depending walls 6 that would disturb the original uniform metering of the molten glass to the concentric lips 15. The concentricity of the lips may be adjusted to a slightly oval shape by bending where needed manually to restrict or to encourage glass flow as the case may be, so that even metering of the glass may be re-established.

Although the invention has been shown in connection with certain particular embodiments thereof, it is apparent that numerous variations and modifications may be made, and it is contemplated in the appended claims to cover all such metering variations and modifications as fall within the true spirit and scope of the invention.

I claim:

1. A feeder in a melter-feeder for producing glass flakes, said feeder including a chamber, said chamber having a generally annular metering outlet, said outlet defined by two generally concentric walls depending downwardly from said chamber, and means for conveying a fluid current generally parallel to the innermost surface of the innermost of said dependent concentric walls, the lowermost portions of said depending walls positioned below the outlet of the fluid current means, whereby molten glass flowing outwardly from the outlet is exuded in the form of a continuous thin walled cylinder formed by flowing between the two concentric walls and whereby fluid current thermally conditions molten glass flowing from the chamber outlet.

2. The feeder of claim 1 including means for deflecting a fluid current against and generally parallel to said innermost surface.

References Cited

UNITED STATES PATENTS

| 2,386,511 | 10/1945 | Slayter et al. | 65—187 |
| 2,457,785 | 12/1948 | Slayter et al. | 65—187 |
| 2,780,889 | 2/1957 | Fulk. | |
| 3,257,184 | 6/1966 | Glaser | 65—187 X |

DONALL H. SYLVESTER, *Primary Examiner.*

W. B. KNIGHT, *Examiner.*

S. LEON BASHORE, F. W. MIGA, *Assistant Examiners.*